(12) United States Patent
Davies et al.

(10) Patent No.: US 7,971,190 B2
(45) Date of Patent: Jun. 28, 2011

(54) MACHINE LEARNING PERFORMANCE ANALYSIS TOOL

(75) Inventors: Bob Davies, Fremont, CA (US); James Chapple, Chandler, AZ (US); William K. Cheung, San Jose, CA (US); Guoping Wen, Cupertino, CA (US); Carolyn Dase, Chandler, AZ (US); Dan Nowlin, Hillboro, OR (US)

(73) Assignee: Intel Corporation, Santa Clara, CA (US)

( * ) Notice: Subject to any disclaimer, the term of this patent is extended or adjusted under 35 U.S.C. 154(b) by 1245 days.

(21) Appl. No.: 11/606,553

(22) Filed: Nov. 30, 2006

(65) Prior Publication Data

US 2008/0133900 A1 Jun. 5, 2008

(51) Int. Cl.
*G06F 9/44* (2006.01)
*G06F 11/30* (2006.01)
*G06F 15/18* (2006.01)

(52) U.S. Cl. .......... 717/127; 717/130; 717/158; 714/47; 702/186; 706/12

(58) Field of Classification Search ................ None
See application file for complete search history.

(56) References Cited

U.S. PATENT DOCUMENTS

| | | | | |
|---|---|---|---|---|
| 5,796,939 | A * | 8/1998 | Berc et al. | 714/47 |
| 6,009,514 | A * | 12/1999 | Henzinger et al. | 712/236 |
| 7,395,527 | B2 * | 7/2008 | DeWitt et al. | 717/127 |
| 7,472,039 | B2 * | 12/2008 | Yamamura et al. | 702/186 |
| 7,594,128 | B2 * | 9/2009 | Bacchus et al. | 713/300 |
| 7,596,430 | B2 * | 9/2009 | Aguilar et al. | 700/299 |
| 7,739,662 | B2 * | 6/2010 | Bouguet et al. | 717/124 |
| 2005/0204346 | A1 * | 9/2005 | Davies | 717/127 |

* cited by examiner

*Primary Examiner* — Michael J Yigdall
(74) *Attorney, Agent, or Firm* — Ryder, Lu, Mazzeo and Konieczny, LLC; Douglas J. Ryder

(57) ABSTRACT

In general, in one aspect, the disclosure describes a method that includes interrupting a program running on a processor. The active instruction that was interrupted is identified. Event counts since a previous interrupt are harvested.

19 Claims, 3 Drawing Sheets

| %ISD | Correlation to IPC | Mean per Sample | Event Name |
|---|---|---|---|
| 92.03% | 0.996941052 | 527064 | FP_COMP_OPS_EXE |
| 89.43% | 0.938669806 | 96023 | RESOURCE_STALLS.RS_FULL |
| 87.51% | -0.925255211 | 1799878 | RAT_STALLS.ROB_READ_PORT |
| 87.06% | 0.938669806 | 96023 | RESOURCE_STALLS.RS_FULL |
| 85.92% | -0.979129124 | 1828028 | RESOURCE_STALLS.LD_ST |
| 85.87% | -0.925255211 | 1799878 | RAT_STALLS.ROB_READ_PORT |
| 85.78% | -0.976520801 | 2043291 | INST_QUEUE_FULL |
| 85.09% | -0.976520801 | 2043291 | INST_QUEUE_FULL |
| 82.51% | -0.838899151 | 215 | BR_MISSP_EXEC |
| 80.66% | -0.979129124 | 1828028 | RESOURCE_STALLS.LD_ST |
| 78.48% | 0.996941052 | 527064 | FP_COMP_OPS_EXE |
| 74.99% | -0.838899151 | 215 | BR_MISSP_EXEC |
| 70.25% | -0.419754275 | 16702 | MCH Event - SM Read Page Hit Channel 1 |
| 68.02% | -0.334802322 | 16679 | MCH Event - SM Read Page Hit Channel 1 |
| 67.08% | -0.439817677 | 16700 | MCH Event - SM Read Page Hit Channel 1 |
| 58.95% | -0.419754275 | 16702 | MCH Event - SM Read Page Hit Channel 1 |
| 58.17% | -0.334802322 | 16679 | MCH Event - SM Read Page Hit Channel 1 |
| 56.98% | -0.454085423 | 55466 | BUS_TRANS_ANY.SELF |

FIG. 1

| Variable name | Importance |
|---|---|
| 2nd level cache Read Misses | 100.00% |
| Writes from the procesor | 55.30% |
| Scalar Single-precision Floating-point Streaming SIMD | 52.80% |
| 2nd-Level Cache Read References | 39.73% |
| 64k Aliasing Conflicts | 33.72% |
| Reads Non-prefetch Full (BSQ) | 29.51% |
| Branches Retired | 4.77% |
| 1st Level Cache Load Misses Retired | 4.39% |
| Reads from the Processor | 4.26% |
| DTLB Pqage Walks (TI) | 4.13% |
| WB Writes Full Underway (BSQ) | 3.81% |
| Bus Accesses From All agents | 3.81% |
| IO Writes Chunk (BSQ) | 3.34% |
| DTLB Load and Store Misses Retired | 2.23% |
| Reads Non-prefetch from the Processor | 2.16% |
| 128-bit MMX™ Instructions Retired | 1.16% |

*FIG. 2*

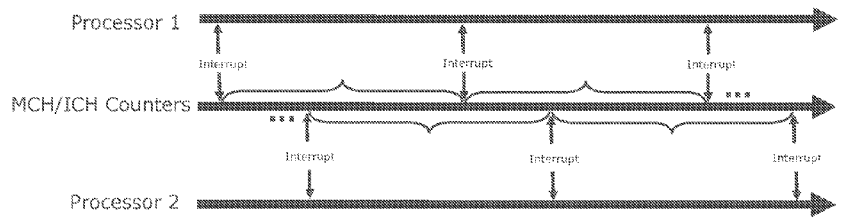

*FIG. 3A*

| Variable Name | Importance |
|---|---|
| MCH Event - IOQ Not Empty | 100.00% |
| MCH Event - IOQ Full | 40.18% |
| L2_LINES_IN.SELF.ANY | 13.21% |
| L2_LINES_OUT.SELF.ANY | 10.41% |
| MCH Event - Primary ReadQ Full (channel 1) | 0.04% |
| MCH Event - Primary CWB Partial Write Eviction (channel 1) | 0.00% |
| MCH Event - Secondary ReadQ Full (channel 1) | 0.00% |
| MCH Event - IOQ Empty | 0.00% |

*FIG. 3B*

| %ISO | Correlation to IPC | Mean per Sample | Event Name |
|---|---|---|---|
| 92.03% | 0.996941052 | 527064 | FP_COMP_OPS_EXE |
| 89.43% | 0.938869806 | 96023 | RESOURCE_STALLS.RS_FULL |
| 87.51% | -0.925255211 | 1799878 | RAT_STALLS.ROB_READ_PORT |
| 87.06% | 0.938869806 | 96029 | RESOURCE_STALLS.RS_FULL |
| 85.92% | -0.979129124 | 1828028 | RESOURCE_STALLS.LD_ST |
| 85.87% | -0.925255211 | 1799878 | RAT_STALLS.ROB_READ_PORT |
| 85.78% | -0.976520801 | 2043291 | INST_QUEUE.FULL |
| 85.09% | -0.976520801 | 2043291 | INST_QUEUE.FULL |
| 82.51% | -0.838899151 | 215 | BR_MISSP_EXEC |
| 80.66% | -0.979129124 | 1828028 | RESOURCE_STALLS.LD_ST |
| 78.48% | 0.996941052 | 527064 | FP_COMP_OPS_EXE |
| 74.99% | -0.838899151 | 215 | BR_MISSP_EXEC |
| 70.25% | -0.419754275 | 16702 | MCH Event - SM Read Page Hit Channel 1 |
| 68.02% | -0.334802322 | 16679 | MCH Event - SM Read Page Hit Channel 1 |
| 67.08% | -0.439617677 | 16700 | MCH Event - SM Read Page Hit Channel 1 |
| 58.95% | -0.419754275 | 16702 | MCH Event - SM Read Page Hit Channel 1 |
| 58.17% | -0.334802322 | 16679 | MCH Event - SM Read Page Hit Channel 1 |
| 56.98% | -0.454086423 | 55466 | BUS_TRANS_ANY.SELF |

*FIG. 4*

MACHINE LEARNING PERFORMANCE ANALYSIS TOOL

BACKGROUND

Performance analysis tools are used to measure parameters describing the performance of processors. Event tools utilize events to trigger an interrupt to the processor and collect data (e.g., extended instruction pointers (EIPs)) that shows where the processor was executing at the point of the interrupt. In addition, the event tools may collect process IDs (PIDs), thread ID (TIDs), and processor IDs and later match these with the loader information showing what executables (including drivers and OS) were loaded at the time of the interrupt. These tools do not collect event counts indicating how many events have been performed over a specific timeframe (e.g., between interrupts). Counter tools track the number of specific events that were performed by the processor during certain time frames (e.g., between interrupts), but do not keep track of what tasks are executing on the processor at the point of the interrupt.

For multi-core environments, it is increasingly difficult to tell what a counter tool is actually observing since a multi-threaded program does not typically bind a thread or process to a specific processor.

BRIEF DESCRIPTION OF THE DRAWINGS

The features and advantages of the various embodiments will become apparent from the following detailed description in which:

FIG. 1 illustrates an example output of a machine learning (ML) tool, according to one embodiment;

FIG. 2 illustrates an example output of an ML tool showing the importance associated with different events within a run, according to one embodiment;

FIG. 3A illustrates an example timeline showing the chipset (e.g., MCH/ICH) counters being harvested by multiple processors, according to one embodiment;

FIG. 3B illustrates an example output of an ML tool showing the importance associated with different processor and chipset events within a run, according to one embodiment; and FIG. 4 illustrates an example output of an ML tool showing the most important events for multiple runs, according to one embodiment.

DETAILED DESCRIPTION

Processors are becoming more complex and multi-core processors are becoming more common. Accordingly, performance analysis is becoming more complex. Instructions per cycle (IPC) is an important metric in determining performance. In order to determine IPC for various functions within a processor you need to know the active function and the number of events performed over a period of time. Accordingly, data collection for a processor needs to identify the active instruction and module (e.g., EIP) at the point of an interrupt as well as tracking event counts for the duration since a previous interrupt.

The data collection method interrupts the processor and collects the active instruction (e.g., EIP, PID, TID, and processor ID like other event tools) and harvests the event counts since the last interrupt (the sampling interval). The interrupt may be generated at defined time intervals (e.g., 1 millisecond). With the event counts covering short intervals and by virtue of tracking what modules are loaded, a program can be followed as it moves from one processor to another.

A feature vector is generated that captures the active instruction and event counts. The feature vector is a high-dimensional vector of features that are tightly correlated to each other and describe the same behavior. The feature vector is the fundamental observation that allows a machine learning (ML) effort to begin. Collecting both active instructions and event counts in a single sampling session (time period) enables the instructions per clock tick (IPC) to be determined. As the active processor data is also being captured, the IPCs can also be determined for function (instruction).

The number of hardware counters (H) that can be harvested at one time is likely less then the total number of events (E). Accordingly, all of the event counts will not be able to be harvested at the same time. In order to capture all of the events a program or benchmark must be run at least E/H times. For example, a Pentium 4 processor by Intel supports 96 total events but can only capture 18 event counters at a time and a Core 2 Duo processor by Intel supports 369 total events but can only capture 2 event counters at a time.

The feature vectors gathered during multiple runs may be fed to the ML tool after the completion of the runs. The ML tool builds a supervised learning problem by using the IPC and feature vector to predict the processor IPC long after that behavior has completed. The predicted value itself is not important but is used to determine events that are the best predictors of the IPC (or any other feature that is deemed appropriate to predict). The purpose of the ML tool predicting IPC is to produce the list of best predictors ordered by importance. The event at the top of the list is the best predictor of the hardware's performance and the bottleneck associated with the program or the function (or any other fragment of the processor's instructions such as basic block or EIP). The list of best predictors may be considered an event rank (similar to Google's page rank).

Since each run will not have all of the events, no single run will include all of the events or have a complete list of best predictors. Each run may have its own list of best predictors. However, the most important function for a particular run may not be the most important event overall. Accordingly, the runs may be ranked as well. Since the difference in runs is the events captured it may be that the runs that are the best predictors have the events that are the best predictors. The runs may be ranked based on the root mean square (RMS) of the runs.

In addition, the improvement in the standard deviation (% ISD) of each run may be computed. That is, the standard deviation is computed for both the actual IPC ($STD_{actual}$) and the error in the IPC ($STD_{error}$), where the error in IPC is the difference between the actual IPC and the predicted IPC. The % ISD is then determined as the difference between the $STD_{actual}$ and the $STD_{error}$ divided by $STD_{actual}$. ($STD_{actual} - STD_{error}$)/$STD_{actual}$. The % ISD may be used to either rank the runs or as a double check to ensure the validity of the ranking of the runs. The smaller the $STD_{error}$ the better the % ISD and the better run is as a predictor. If the ML technique could predict 100% of the value of the IPC then the prediction error is zero, indicating that there is a complete understanding of the processor's performance.

Figure 1:
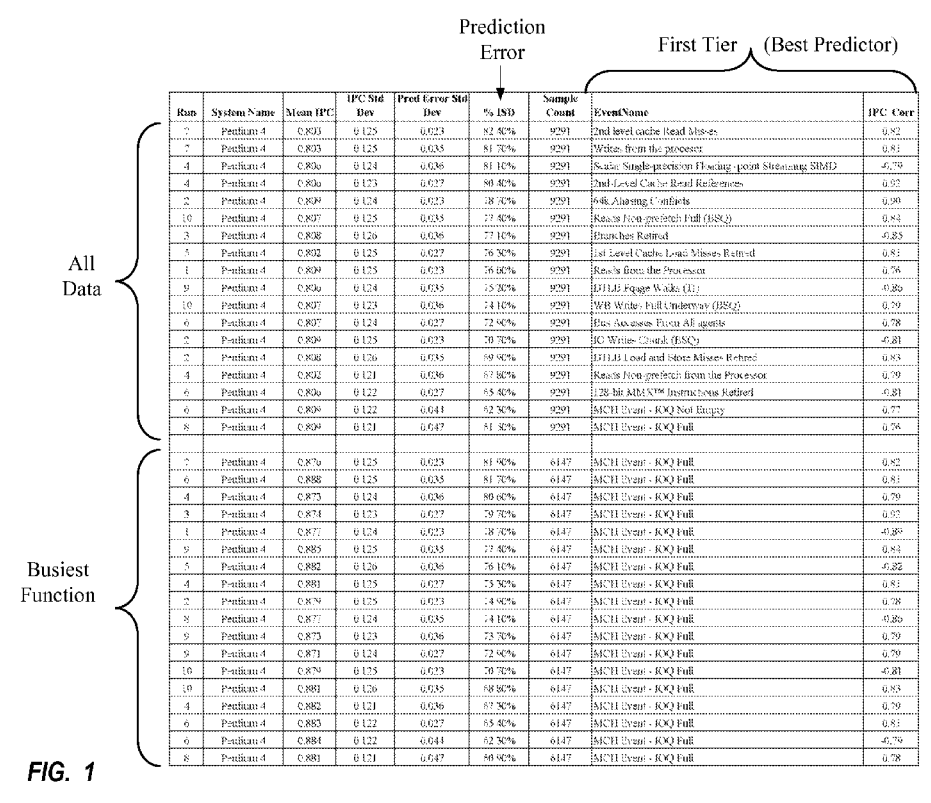

FIG. 1 illustrates an example output of the ML tool. The output may be a very large spreadsheet that lists each of the runs as a row. The spreadsheet may be capable of illustrating the raw data (data for each of the runs) and may also be capable of filtering the data by function (e.g., busiest function) or other parameters (e.g., module, thread, phase) depending on the data collected. The order of the runs may be based on the runs that are deemed to be the best predictors of IPC or have best prediction error (e.g., RMS, % ISD). Within each run, the data associated with events deemed to be the best predictors are illustrated first, followed by events deemed to be next best and so on.

FIG. 2 illustrates an example ML tool output showing the importance associated with different events within a run. The most important event is assigned a 100% importance factor and the other events are assigned relative percentages based on how important they are with respect to the most important event. As illustrated, the $2^{nd}$ level cache read misses is deemed the most important event and the writes from processor event is the next most important event and is deemed 56% as important as the most important event.

According to one embodiment, the measurement technique is extended to include event counts from non-processor silicon nearby on the motherboard (e.g., chipsets). The ML tool collects the processor counters available while also collecting the chip set (e.g., memory controller hub (MCH), I/O controller hub (ICH)) counters. Because these counters are harvested at the same time at the end of the sampling period, they describe the complex and disconnected relationship between the main processor and the chipsets.

The chipsets may not be associated with a single processor but instead may be shared among processors. Accordingly, the activity of the chipsets can not be attributed to a specific processor. Rather, the chipset counters are free running and each processor harvests the chipset event counts that have occurred since the previous processor interrupt.

FIG. 3A illustrates an example timeline showing the chipset (e.g., MCH/ICH) counters being harvested by multiple processors. The interrupts of the processors may not occur at the same time. Accordingly, processor 1 harvests the event counts that happen between its interrupts and processor 2 does the same.

This platform-wide view enables a broader set of problems to be visible to anyone using the ML tool. The relationship between the chipset counters and those collected on the processor can be expressed mathematically. The ML tool can predict the IPCs for all samples and generate the list of best predictors that includes chipset events.

The list of best predictors (event rank) can show if the chipset counters are more important to the system's performance than the architectural features described by the processor events. In other words, the ML tool enables a user to determine if the platform bottleneck is in the processor or in some peripheral chip's activity through this direct comparison of chipset counters and processor counters.

FIG. 3B illustrates an example ML tool output showing the importance associated with different processor and chipset events within a run. As illustrated, an MCH event (IOQ not empty) is deemed the most important event and the second most important is also an MCH event (IOQ empty).

FIG. 4 illustrates an example ML tool output showing the most important events for multiple runs. FIG. 4 may be a small portion of the overall output of the ML tool illustrated in FIG. 1. The events listed may be either processor events or chipset events. The runs are listed in the order of importance as far as predicting IPC based on RMS, % ISD or some combination thereof. The % ISD is illustrated for each of the runs. In addition, a correlation is illustrated for each of the best predictor events for the run. The correlation describes an event's relationship to IPC in a single number. Correlations will range from −1 (negative correlation) to 0 (neutral correlation) to +1 (positive correlation.)

In the context of the ML tool, the correlation indicates whether an event is flowing with or fighting the IPC. An event with a positive correlation may be described as flowing with the IPC while an event with a negative correlation may be described as fighting the IPC. To utilize the ML tool, one may first look at the highest rated events having a negative correlation as the events possibly creating bottlenecks. As illustrated, the third ranked event is the first event having a high negative correlation. It should be noted that each event is listed twice because two separate ML programs were used to predict the best events and runs.

As previously mentioned a fundamental problem with hardware counters for the processor (and chipset if enabled) is that there are only a fixed number that may be active at a time. This makes it impossible to collect all the events at the same time. Various runs can not be put together to create a single feature vector having all of the event counts due to the fact that the time is not synchronized (being collected at different times and different phases of the program).

According to one embodiment, the ML tool may extract the feature vector from the processor (and chipset) at user generated markers that identify when the interrupt should be performed. The markers may be placed at the point in the program where phases change and at the point the marker was activated an interrupt would be initiated and a feature vector would be captured. In addition to capturing the data previously noted (event counters, interrupted function ID) the feature vector would also capture the phase of the program. If interrupts were being captured every millisecond and the marker was activated at ½ millisecond a feature vector would be created for that ½ millisecond and then continue every millisecond from there.

Using markers enables the tool to generate interrupts at the precisely the same point in the program regardless of when it is run or what counters are active. The ability to synchronize multiple sampling sessions with clocktick accuracy makes sure that the same activity from different sessions and different counters is being measured by the different sampling sessions. Accordingly, it is possible for the various feature vectors to be combined into a single feature vector that captures all of the event counters. For example, all of the feature vectors for a particular phase could be combined into a single feature vector.

Feature vectors of this length will accurately describe processor activity better than any available tool. Machine learning software will allow all these events to be ranked in order of their importance.

The shortcoming of this approach is that the program must be modified to include some marker code that indicates where the synchronization should take place. Sometimes the program source code is unavailable. Other times, the expertise to modify the code in the right places is not easy. But if these simple criteria are met, the program may be analyzed with a complete awareness of the platform's metrics.

Although the disclosure has been illustrated by reference to specific embodiments, it will be apparent that the disclosure is not limited thereto as various changes and modifications may be made thereto without departing from the scope. Reference to "one embodiment" or "an embodiment" means that a particular feature, structure or characteristic described therein is included in at least one embodiment. Thus, the appearances of the phrase "in one embodiment" or "in an embodiment" appearing in various places throughout the specification are not necessarily all referring to the same embodiment.

An embodiment may be implemented by hardware, software, firmware, microcode, or any combination thereof. When implemented in software, firmware, or microcode, the elements of an embodiment are the program code or code segments to perform the necessary tasks. The code may be the actual code that carries out the operations, or code that emulates or simulates the operations. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor/machine readable/accessible medium include an electronic circuit, a semiconductor memory device, a read only memory (ROM), a flash memory, an erasable ROM (EROM), a floppy diskette, a compact disk (CD-ROM), an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The term "data" here refers to any type of information that is encoded for machine-readable purposes. Therefore, it may include program, code, data, file, etc.

All or part of an embodiment may be implemented by software. The software may have several modules coupled to one another. A software module is coupled to another module to receive variables, parameters, arguments, pointers, etc. and/or to generate or pass results, updated variables, pointers, etc. A software module may also be a software driver or interface to interact with the operating system running on the platform. A software module may also be a hardware driver to configure, set up, initialize, send and receive data to and from a hardware device.

An embodiment may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

The various embodiments are intended to be protected broadly within the spirit and scope of the appended claims.

What is claimed:

1. A method comprising
running a program on a processor;
interrupting operation of the processor as the program is running;
capturing data associated with the operation of processor when it is interrupted, wherein the data captured includes an active instruction of the processor that was interrupted and processor event counts, wherein the processor event counts capture a number of times the processor events have occurred since a previous interrupt;
generating a feature vector from the data captured including the active instruction interrupted and the event counts;
calculating instructions per cycle (IPC) for the processor based on the feature vector; and
analyzing the feature vector to determine events that are best predictors of the processor IPC.

2. The method of claim 1, wherein said interrupting includes interrupting the processor at defined time intervals.

3. The method of claim 2, wherein the defined time intervals are on the order of milliseconds.

4. The method of claim 1, wherein said interrupting is based on encountering a marker in the program.

5. The method of claim 4, wherein the marker is based on phase.

6. The method of claim 1, wherein said capturing data includes capturing the processor event counts by tracking processor event counters.

7. The method of claim 1, wherein said capturing data includes capturing chipset event counts by tracking chipset event counters, wherein the chipset event counts capture a number of times the chipset events have occurred since a previous interrupt of the processor.

8. The method of claim 1, wherein said capturing includes capturing a portion of a total number of processor event counts during each interrupt of the processor so said interrupting and said capturing are repeated until all processor event counts are captured.

9. The method of claim 8, wherein for each run of said interrupting and said capturing:
said generating includes generating a run feature vector; and
said calculating includes calculating the IPC of the processor based on the run feature vector.

10. The method of claim 9, wherein said analyzing further includes ranking the run feature vectors based on which ones are best predictors of the processor IPC.

11. The method of claim 1, wherein said analyzing includes predicting the processor IPC and using the predicted value to determine the events that are the best predictors of the processor IPC.

12. A processor-readable storage medium storing content, which, when the content is executed by a processor the content causes the processor to:
interrupt operation of the processor as a program is running thereon;
capture data associated with the operation of processor when it is interrupted, wherein the data captured includes an active instruction of the processor that was interrupted and processor event counts, wherein the processor event counts capture a number of times the processor events have occurred since a previous interrupt;
generate a feature vector from the data captured including the active instruction interrupted and the event counts;
calculate instructions per cycle (IPC) for the processor based on the feature vector; and
analyze the feature vector to determine events that are best predictors of the processor IPC.

13. The processor-readable storage medium of claim 12, wherein when executed by the processor the content causes the processor to capture the processor event counts by tracking processor event counters.

14. The processor-readable storage medium of claim 12, wherein when executed by the processor the content further causes the processor to capture chipset event counts by tracking chipset event counters, wherein the chipset event counts capture a number of times the chipset events have occurred since a previous interrupt of the processor.

15. The processor-readable storage medium of claim 12, wherein when executed by the processor the content further causes the processor to
 capture a portion of a total number of processor event counts during each interrupt of the processor;
 repeat the interrupting and the capturing until all processor event counts are captured; and
 generate a run feature vector including the interrupted instruction and event counts for each interrupt and capture run.

16. The processor-readable storage medium of claim 15, wherein when executed by the processor the content further causes the processor to calculate the IPC of the processor based on each run feature vector.

17. The processor-readable storage medium of claim 16, wherein when executed by the processor the content further causes the processor to rank the run feature vectors based on which ones are best predictors of the processor IPC.

18. The processor-readable storage medium of claim 15, wherein when executed by the processor the content further causes the processor to capture the phase of processor at the point of the interruption, include the phase in the run feature vectors generated and combine the run feature vectors having the same phase into a single run feature vector including the event counters from each of the run feature vectors.

19. The processor-readable storage medium of claim 12, wherein when executed by the processor the content further causes the processor to predict the processor IPC and use the predicted value to determine the events that are the best predictors of the processor IPC.

* * * * *